G. W. DONNING.
TYPE WRITER.
APPLICATION FILED JAN. 19, 1906.

929,839.

Patented Aug. 3, 1909.
5 SHEETS—SHEET 1.

WITNESSES:

INVENTOR:
George W. Donning,
by his attorney.

G. W. DONNING.
TYPE WRITER.
APPLICATION FILED JAN. 19, 1906.

929,839.

Patented Aug. 3, 1909.
5 SHEETS—SHEET 4.

Fig. 6.

WITNESSES:
Philip Ferrell
J. F. Brandenburg

INVENTOR:
George W Donning
by R. S. Dyrenforth
his attorney.

UNITED STATES PATENT OFFICE.

GEORGE W. DONNING, OF STAMFORD, CONNECTICUT, ASSIGNOR TO HARRY T. AMBROSE, OF ORANGE, NEW JERSEY.

TYPE-WRITER.

No. 929,839.　　　　　Specification of Letters Patent.　　　　Patented Aug. 3, 1909.

Application filed January 19, 1906. Serial No. 296,897.

*To all whom it may concern:*

Be it known that I, GEORGE W. DONNING, a citizen of the United States, residing at Stamford, in the county of Fairfield and State of Connecticut, have invented certain new and useful Improvements in Type-Writers; and I do hereby declare the following to be a full, clear, and exact description of the invention, such as will enable others skilled in the art to which it appertains to make and use the same.

This invention relates to flat-platen typewriters, and more particularly to automatic locking means for turning or tilting parts thereof.

In a former application of mine, filed Sept. 23, 1901, Serial No. 76,288 (patented July 17, 1906, as No. 826,482), is disclosed a tiltable flat platen normally occupying a horizontal plane beneath the traveling machine proper and provided with an elevating-spring tensioned to raise it upon release of a lock, which, upon lowering of the platen, secures it automatically in normal horizontal position against the tension of the spring. Pivoted main tracks or track-rail sections have also, heretofore, been furnished with an elevating spring, which, when the traveling machine proper is removed from these track-rail sections, as by being pushed back onto a rest section or sections, serves to raise the pivoted track region. However, the use of raising springs in connection with platens and track-rails or a track-frame is not unattended with disadvantage; and, in reality, the utility of these springs as elevating means is not so great. Particularly in the case of the platen, while the hand of the operator is engaged at the front of the platen releasing the automatic lock, it would require but a scarcely appreciable amount of time to throw the platen, by hand, to raised position; and, of course, the weight of this member is so slight as to impose no tax upon the strength of the operator. And, while the track-rails are slightly heavier than the platen, even these would not demand more than a slight exertion while being raised. It is obvious, too, that, in case the traveling machine is not adapted to be removed from the pivoted track-frame, but must be raised with the latter, an elevating spring would be practically out of the question. With these conditions in view, my invention may be said to consist in a lock, or locking means, for automatically retaining in raised position a tilting member, in particular a manually-elevated tilting-member, which normally occupies a horizontal plane beneath the traveling machine.

Preferably, a spring is utilized for bringing about this automatic locking of the tilting member in elevated position, it being obvious that a spring which has only to throw a light locking part for a short distance may be much lighter than an elevating spring and is not subject to the wear that would be imposed upon such an elevating member.

In the absence of an elevating spring, it follows that a lock for securing the tilting member in normal position solely against the tension of such a spring is no longer necessary. However, in the form of typewriter forming the subject-matter of various applications of mine, and which is illustrated in the accompanying drawings as embodying the present improvements, there is provided a book-rest which is adjustable to different thicknesses of books. In the operation of this form of book-rest, the open book is laid upon rising and falling book-supporting leaves which automatically level the surfaces of the two sides of the book, and then the whole book-rest is elevated by hand till the book presses at one side against the under side of the platen. For this reason, and to secure other advantages which will suggest themselves, I propose to make provision for locking the platen in depressed as well as in elevated position. This double-locking feature will also be found to be of value in connection with track-rails; and, as will become apparent, it is not essential whether the double-locking means includes one or two locking devices, the invention in this aspect consisting rather in the idea of locking a tilting member, when elevated, against depression, and, when in normal position, against raising.

A further feature of novelty consists in the provision of means for locking the tilting member at a plurality of elevations above normal position. It will be seen that both this and the last feature contemplate means for locking the tilting member at a plurality of relative elevations.

Still another feature consists in the provision, in connection with means for locking the tilting member when depressed, of means for locking the member at a plurality of elevations above normal position.

Referring to the drawings.

In the drawings, and more particularly in Figs. 1–4, A represents any suitable form of table or support having a transverse opening $a$ in its top.

B is the traveling machine which moves longitudinally upon intermediately-pivoted track-rails C connected by tie-bars $c$ to form track-frame C'. The track-rails are pivoted as at $c'$ to a trunnion plate $c^2$ which is secured to the top of the table in rear of opening $a$, and are designed to rest when in normal position upon plate $c^3$ at the front of the opening.

D is the flat platen, which normally occupies a plane beneath the writing mechanism and spans the opening $a$ in the table top, resting at its front upon plate $c^3$ and being provided at rear and on either side with hinge members $d$, which are connected by pivot rod $d'$ to trunnion plate $c^2$.

Located in the opening $a$ beneath the platen is the laterally-traveling and vertically-adjustable book-rest E, which forms the subject-matter of my co-pending application filed Sept. 23, 1901, Serial No. 76,288, and is, therefore, not now claimed specifically. Said book-rest E comprises a rectangular frame $e$ provided with rollers $e'$ traveling upon ways $e^2$ extending transversely within the table top, and rising and falling leaves $e^3$ which are carried by parallel arms $e^5$ pivoted to frame $e$, and are connected for simultaneous movement in opposite directions by equalizing lever $e^6$. Lever $e^6$ is pivoted intermediate its length upon a pin $e^7$ which projects forward from a vertical, toothed cam-plate $e^8$ meshed by toothed pinion $e^9$. Turning of pinion $e^9$ by handle $e^{10}$ rotates the cam-plate and changes the elevation of the pivot pin $e^7$, and consequently of the book-supporting leaves $e^3$, whereby the book-rest may be adjusted to accommodate books of different thickness and to force a superposed book well up underneath the platen.

The parts so far described are not specifically new with this application, and hence are not claimed as separate structures, though they form parts of the several combinations hereinafter to be pointed out.

Trunnion plate $e^2$ is provided at either end with a forwardly projecting bracket $f$; and these brackets support a rock-shaft $f'$ which extends transversely beneath the rear of the platen and is encircled by a light coil-spring $f^2$, for a purpose presently to be pointed out. Shaft $f'$ is furnished adjacent each hinge-member $d$ of the platen with a rigidly secured link $f^3$ of a locking device F. The complementary link $f^4$ of each locking device is pivoted at $f^5$ to the first link and at $f^6$ to hinge member $d$. Adjacent its pivot $f^6$, each link $f^4$ is provided with a flat retaining face $f^7$, which, when the pivotal point $f^5$ of the two links has been thrown forward slightly past center, engages with the under side of the hinge-member and prevents further movement of the links in this direction.

The spring $f^2$ is tensioned so as to tend to throw the links in the direction just described; and an operating handle $f^8$ is secured to one end of rock-shaft $f'$ for the purpose of throwing the links in the other direction. When the platen is raised, the movement of this member straightens the links from their collapsed position shown in dotted lines in Fig. 1, until the spring $f^2$ finally throws pivotal point $f^5$ slightly past center. By this action the platen is automatically locked against the force of gravity, the retaining face $f^7$ preventing the links from collapsing forward and the position of pivot $f^5$ past center preventing the links from collapsing rearward, whereby the links constitute a rigid brace for the platen. In order to release the platen for depression, the handle $f^8$ is forced rearward, thereby slightly elevating the platen till pivotal point $f^5$ is disposed to the rear of center, when the platen is lowered by its own weight.

As already indicated, the platen is to be automatically locked in either its raised or depressed position. One form of device for performing this function when the platen is returned to normal position will now be discussed. At its forward portion, the platen is provided with a depending beveled catch $g$ which co-acts with an automatic lock G on plate $c^3$ of the table top. Said lock consists of an angulated lever $g'$ pivoted to upright post $g^2$ and provided with a lateral locking arm $g^3$ and a forwardly extending arm $g^5$. The forwardly-extending arm $g^5$ constitutes an operating handle for releasing the lock; and a spring $g^6$ serves to urge arm $g^3$ constantly in a forward direction. When the platen is depressed, catch $g$ rides over the front edge of arm $g^3$, forcing the arm to the rear till it springs into the rearwardly-opening notch $g^7$ in the catch. This form of locking device is part of the subject-matter of my co-pending application, Serial No. 76,288, already referred, and, while not specifically claimed in the present application, is selected as illustrative of one form of automatic lock that may be employed in accordance with my present invention for securing the platen in normal position and in connection with an automatic locking device for retaining the same member in raised position.

Figure 7:
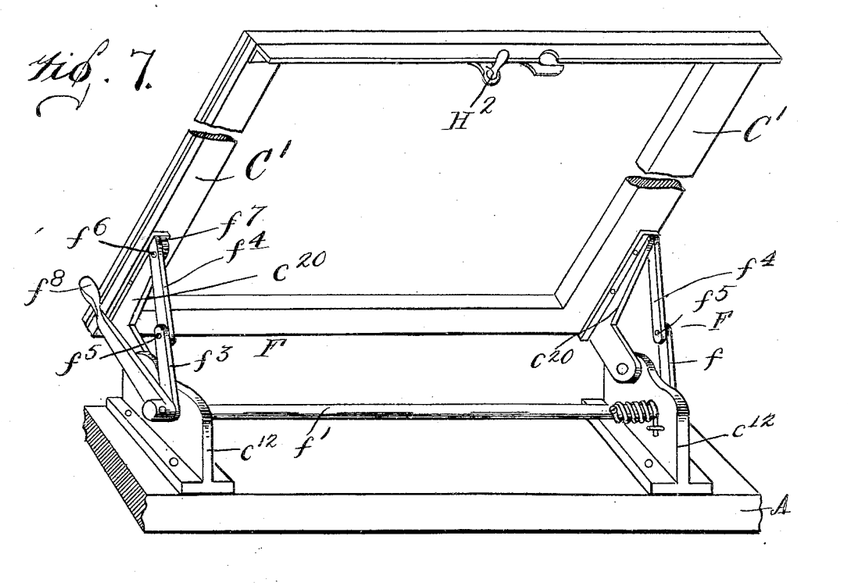
Fig. 7 is a perspective view showing the form of locking device illustrated in Figs. 1–3 applied to a pivoted track-frame.

As already stated, the underlying idea of my invention in this aspect is the provision of a tilting member, whether platen or otherwise, which is automatically locked in a plurality of positions; and in Fig. 7 is illustrated a form of locking device $F'$ constructed to lock the member in both depressed and raised positions. Said locking device consists of a flat bowed spring provided with a flat top $f^{20}$, which is in engagement with the hinge member $d^{20}$ of the tilting member, here illustrated as the platen. The hinge member is formed with two flat locking faces $d^{21}$, which form a V, and one of which is adapted to lie flat upon the top of the spring when the platen is raised, while the other occupies a similar position when the platen is depressed. When the platen is moved from one position to another the point of the V is obliged to arch the top of the spring downwardly against the tension thereof, so that, in either raised or lowered position, the tilting member is securely held.

Figures 4, 5:
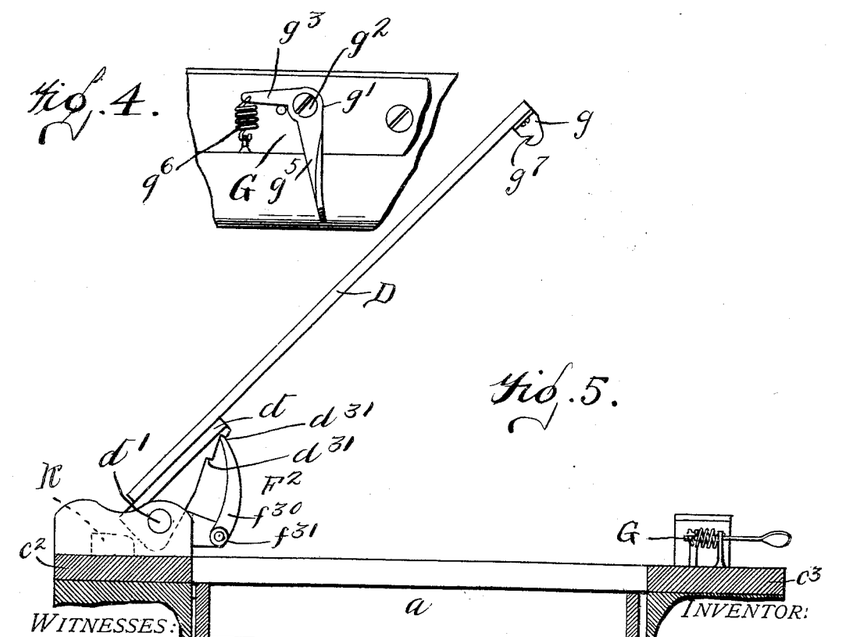
Fig. 4 is a plan view of the table-half of the automatic locking device for retaining the platen in normal position.
Fig. 5 is a side elevation of another form of automatic lock for retaining the tilting member in a plurality of positions.
Figure 6:
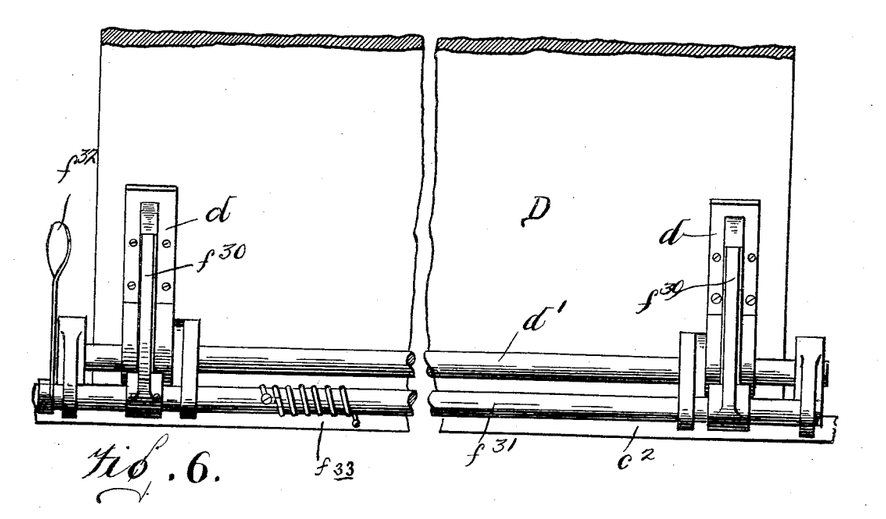
Fig. 6 is a front elevation of the same.

In Fig. 5, still another form of locking device $F^2$ is shown. In this construction, a locking finger $f^{30}$ is secured to either end of a rock-shaft $f^{31}$ passing transversely beneath the rear of the tilting member, in this case being again shown as the platen. The shaft is provided with an operating handle $f^{32}$ and a spring $f^{33}$, the latter being tensioned to turn the shaft counter-clockwise in Fig. 5. The hinge-member $d^{30}$ of the platen is provided with a plurality of rearwardly-facing locking notches $d^{31}$, into which the free end of locking finger $f^{30}$ is designed to take when the platen has been elevated to predetermined points. In the operation of this form of my invention, the tilting member is raised, and is followed in its upward movement by the locking finger which moves under the actuation of its spring. At the proper moment, the free end of the finger springs behind one or other of the locking notches $d^{31}$ and the platen is automatically locked against falling. To release the platen, the operating handle is pulled forward, the platen having been first slightly raised, and the tilting member then descends of its own weight, forcing the locking finger downward and forward, to which movement the light spring $f^{33}$ opposes scarcely any force. It will thus be seen that these parts constitute means for locking the tilting member at a plurality of elevations above normal position, or, broadly, means for locking the member at a plurality of relative elevations, which latter designation may also be applied to the constructions already discussed. In addition, in the present instance, the catch $g$ and lock G are also provided at the front of the platen, as already described in connection with Fig. 1. If desirable, an abutment K may be located in rear of the tilting member to prevent its being thrown too far to the rear.

Figure 1:
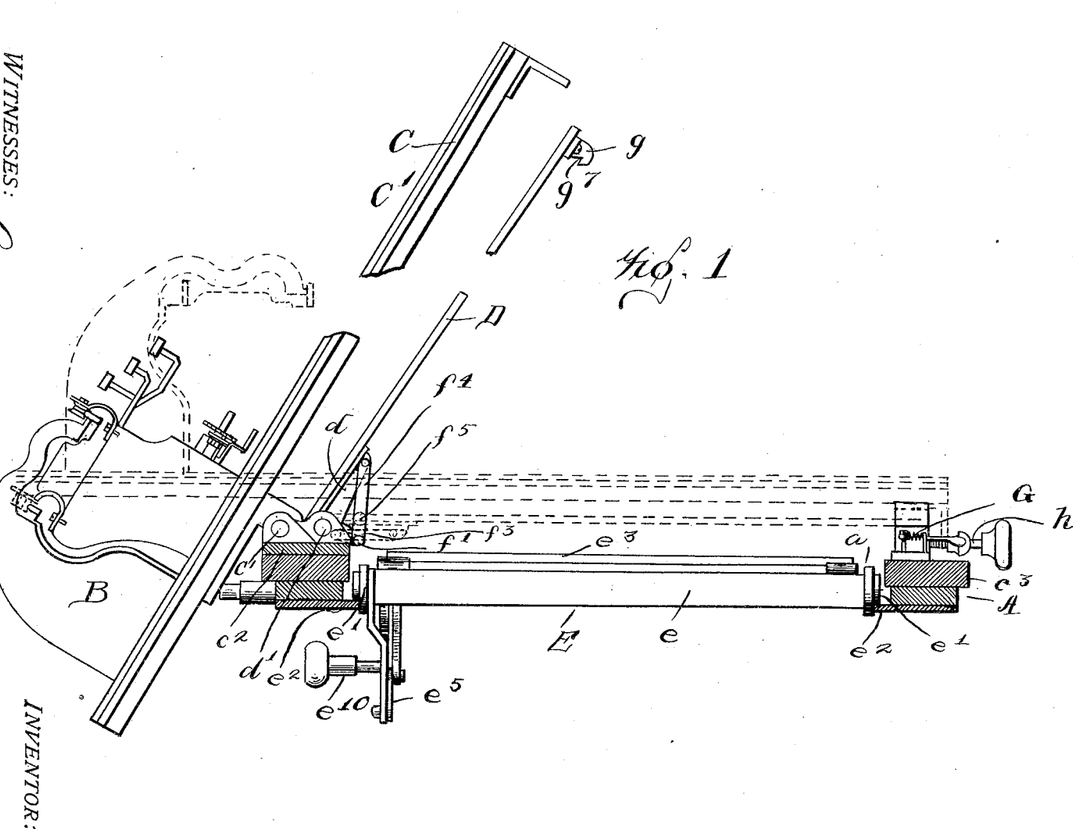
Figure 1 is a sectional side elevation of a complete typewriter embodying my present improvements, the track-rails, platen and traveling machine being shown in full lines in the positions which they occupy when the parts are raised, and the same parts being shown in dotted lines in their normal or depressed positions.
Figure 2:
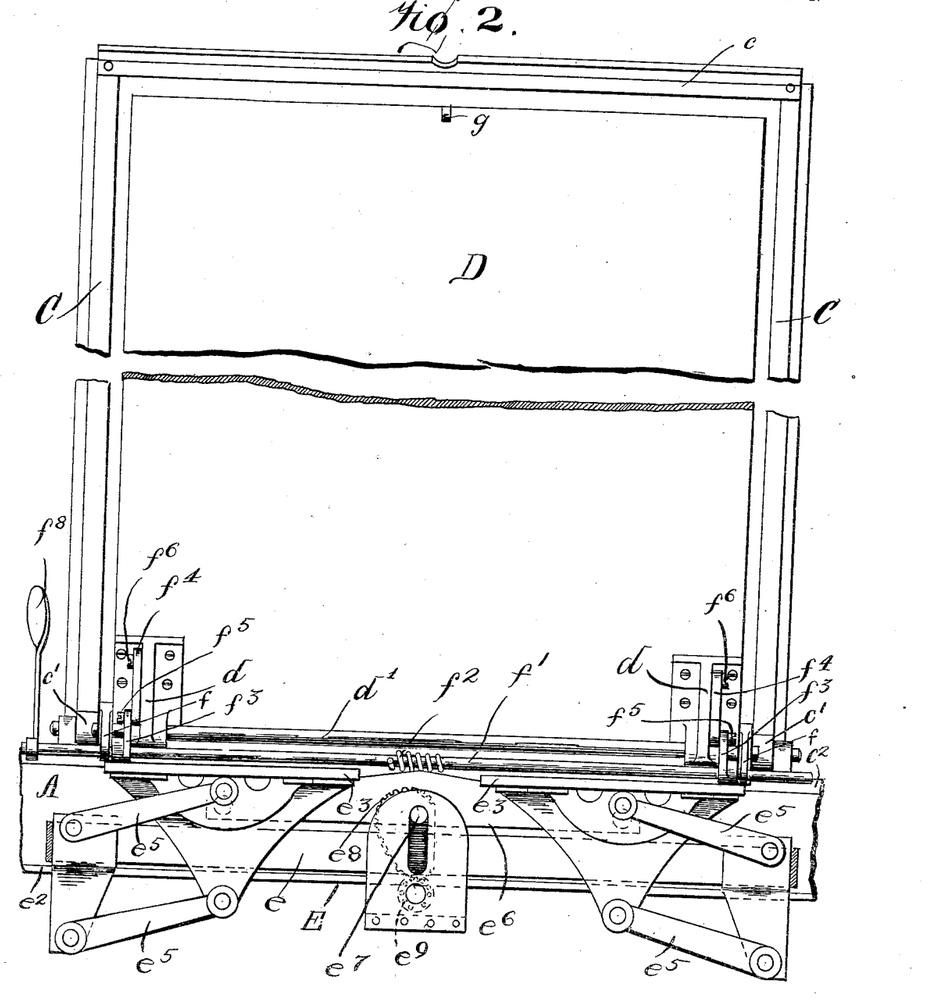
Fig. 2 is a sectional front elevation of the same.
Figure 3:
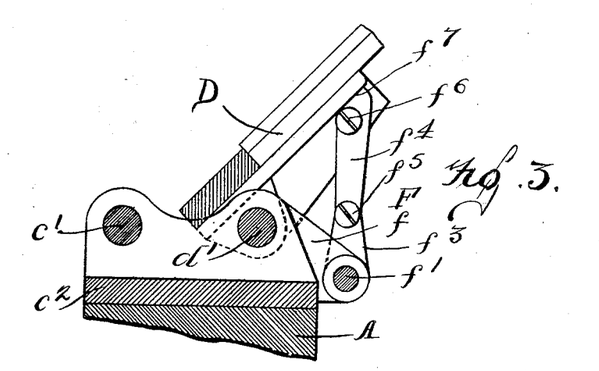
Fig. 3 is a side elevation on an enlarged scale of the form of locking device shown in Figs. 1 and 2 for securing the platen in elevated position.

In Fig. 7, I have shown the form of locking device illustrated in Fig. 1 applied to the track-frame. While I have selected this particular form of locking device for illustration of the applicability of my invention to other tilting members than the platen, it is not to be understood that the other forms of locking device already discussed could not also be employed to advantage with the track-rails. In this figure, $C'$ represents the track-rails, or track-rail sections pivoted at their rear ends at $c^{20}$ to the trunnion plate $c^2$. Locking device F is mounted as before, except that link $f^4$ is pivoted at $f^6$ to the hinge member $c^{20}$ of the track-rail. The mode of operation of the locking device is the same as already described in connection with Fig. 1.

Figure 8:
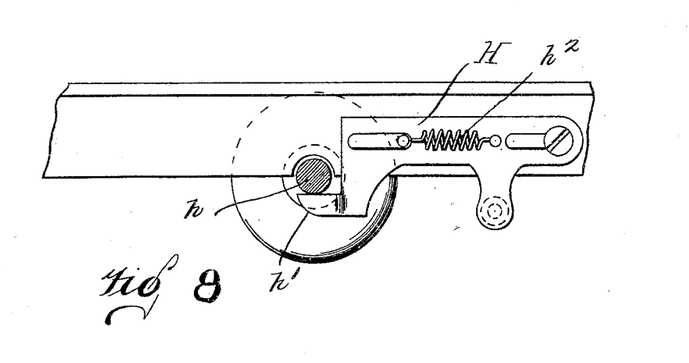
Fig. 8 is a rear elevation of the automatic lock for securing the track-frame in depressed position.

In Figs. 7 and 8, I have also shown an automatic locking device for securing the track-frame in normal or horizontal position, such means constituting a bolt $h$ projecting forward from plate $c^3$ on the table top and laterally sliding latch H on the front of the track-frame. Latch H is beveled upwardly on the lower surface of its projecting end as at $h'$, and is held at the limit of movement in one direction by means of a spring $h^2$. Upon depression of the track-frame the bevel $h'$ rides on the top of bolt $h$, see also Fig. 1, forcing the latch to one side against the tension of the spring, until the latter forces it into locking position beneath the bolt. This form of locking device for securing the track-rails in horizontal position is also disclosed in my former application, Serial No. 76,288, and will therefore not be specifically claimed in the present application.

What is claimed as new is:

1. In a typewriting-machine, the combination of the following elements: a base; a traveling mechanism; two members normally-supported in a horizontal plane above said base and comprising a flat-platen and a track-frame upon which the writing-mechanism is supported and travels, one of which members is tiltable away from its normal horizontal, operative position and independent of the position of said other member; a pivotal connection between the base and said tiltable member; a locking device connected to said base and disposed contiguous to said pivotal connection and operative automatically toward the limit of the tilting movement of said tiltable member to retain the same out of operative position and against return-movement after having been tilted to a predetermined point, whereby elements of the typewriter underlying said member are exposed and an oscillating member connecting with the locking device and operative to actuate the same to operate the tiltable-member.

2. In a typewriting machine, the combination of the following elements: a base; a traveling writing-mechanism; two members normally supported in a horizontal plane above said base and comprising a flat-platen and a track-frame upon which the writing-mechanism is supported and travels, one of which members is tiltable away from its normal horizontal position and independent of the position of said other member; a pivotal connection between the base and said tiltable member; a lock connected to said base and disposed contiguous to said pivotal connection and automatically operative, at a plurality of undetermined points, toward the limit of the tilting-movement of said tiltable member, to retain said member out of its horizontal position and against return to said position, whereby the base underlying said member is exposed and an oscillating member connecting with the locking device and operative to actuate the same to operate the tiltable-member.

3. In a typewriting-machine, the combination of the following elements: a base; a traveling mechanism; two members normally supported in a horizontal plane above said base and comprising a flat platen and a track-frame upon which the writing-mechanism is supported and travels, one of which members is tiltable away from its normal horizontal, operative position and independent of the position of said other member; a pivotal connection between the base and said tiltable member; a locking-device connected to said base and disposed contiguous to said pivotal connection and operative automatically toward the limit of the tilting movement of said tiltable member to retain the same out of operative position and against return-movement after having been tilted to a predetermined point, whereby elements of the typewriter underlying said member are exposed and an oscillating member connecting with the locking-device and operative to actuate the same to operate the tiltable-member; and means for locking said member against tilting when depressed to normal position.

4. In a typewriting-machine, the combination of the following elements: a base; a traveling mechanism; a traveling book-support disposed below the plane of the base; two members overlying said book-support and sustained normally in a horizontal plane on said base and comprising a flat platen and a track-frame upon which the writing-mechanism travels, one of said members being tiltable away from its normal horizontal position; a pivotal connection between the base and said tiltable member; a lock connected to said base and disposed contiguous to said pivotal connection and operable automatically, toward the limit of the tilting movement of said member, to retain the same out of its horizontal position and against return-movement, whereby access to, and positioning of a book on, the underlying book-support is permitted, and an oscillating member connecting with the locking-device and operative to actuate the same to operate the tiltable-member.

5. In a typewriting-machine, the combination of the following elements: a base; a traveling-mechanism; a traveling book-support disposed below the plane of the base; two members overlying said book-support and sustained normally in a horizontal plane on said base and comprising a flat platen and a track-frame upon which the writing-mechanism travels, one of said members being tiltable away from its normal horizontal position; a pivotal connection between the base and said tiltable member; a lock connected to said base and disposed contiguous to said pivotal connection and operable automatically, toward the limit of the tilting-movement of said member, to retain the same out of its horizontal position and against return-movement, whereby access to, and positioning of a book on, the underlying book-support is permitted; and an oscillating member connecting with the locking-device and operative to actuate the same to operate the tiltable-member, and means for locking said member against upward tilting after being depressed to its horizontal position.

6. In a typewriting-machine, the combination of the following elements: a base; a traveling writing-mechanism; a traveling book-support mounted below the plane of the base; a track-frame upon which the writing-mechanism travels and overlying the book-support; a platen also overlying the book-support and tiltable away from the same and normally supported in a horizontal plane on the base; a pivotal connection between the base and said tiltable platen; a lock connected to said base and disposed contiguous to said pivotal connection and operable automatically, toward the limit of the tilting movement of said platen, to retain said platen out of its horizontal position and against return-movement, whereby access to, and positioning of a book on, the underlying book-support, is permitted and means for locking said member against tilting when depressed to normal position.

7. In a typewriting-machine, the combination with a base, and writing mechanism longitudinally and laterally movable thereover for line and letter spacing, of a member normally disposed in a substantially horizontal plane beneath the writing mechanism, means pivoting said member to the base for upward tilting, a rock shaft supported on the base, means for operating said shaft, and a member operable by said shaft to lock the tilting member when elevated.

8. In a typewriting machine, the combination with a base, and writing mechanism longitudinally and laterally movable thereon for line and letter spacing, of a member normally disposed in a substantially horizontal plane beneath the writing mechanism, means pivoting said member to the base for upward tilting, a rock shaft supported on the base parallel to and adjacent the pivotal axis of said tilting member, means secured to the shaft for locking the tilting member when elevated, and operating means for the shaft.

9. In a typewriting machine, the combination with a base, and writing mechanism longitudinally and laterally movable thereon for line and letter spacing, of a member normally disposed in a substantially horizontal plane beneath the writing mechanism, means pivoting said member to the base for upward tilting, a rock shaft supported on the base, a device operated by the rock shaft to lock the tilting member when elevated, and means for automatically operating the rock shaft for locking when the tilting member has been elevated to a predetermined point.

10. In a typewriting machine, the combination with a base, and writing mechanism longitudinally and laterally movable thereon for line and letter spacing, of a member pivoted to the base for upward tilting and normally disposed in a substantially horizontal plane beneath the writing mechanism, a rock shaft supported on the base, a device operated by the rock shaft to lock the tilting member when elevated, means for automatically rocking the shaft in one direction to effect locking, and manual means for rocking the shaft in the reverse direction for unlocking.

11. In a typewriting machine, the combination with a base, and with a writing mechanism longitudinally and laterally movable thereon for line and letter spacing, of a member pivoted to the base for upward tilting and normally disposed in a substantially horizontal plane beneath the writing mechanism, a rock-shaft supported on the base, a device operated by the rock shaft to lock the tilting member when elevated, a coil spring encircling the shaft and disposed to effect automatic locking, and an unlocking handle carried by the shaft.

12. In a typewriting-machine, the combination with a base, a book-support disposed in said base, and writing-mechanism movable longitudinally and laterally over said book-support, of a platen pivoted to the base for upward tilting and normally disposed in a plane beneath the writing-mechanism, a rockshaft supported on the base parallel to and adjacent the pivotal axis of the tilting-platen, locking-devices connecting with said shaft adjacent the two sides of, and operating to lock, the tilting-member in a tilted position away from the underlying book-support, and means for rocking the shaft to effect locking-engagement of said devices through the platen when tilted.

13. In a typewriting-machine, the combination with a base, of a track-frame and a flat platen both supported, normally, in a horizontal position on said base, pivotal connection between the base and one of said members to permit such member to tilt upward independent of the position and operation of the other of said members, a locking-element connected to said base for securing the tilting-member elevated, means including a rotatable member disposed contiguous to the lock and operable to actuate said lock when the tilting-member has been elevated to a predetermined point, and manual means connecting with the said lock-actuating means for releasing the lock.

14. In a typewriting-machine, the combination of the following elements: a base; a book-support disposed below the plane of the base; a track-frame pivoted on said base; a pivoted connection between said base and the track-frame located intermediate of the ends of the track-frame; a writing-mechanism supported on said track-frame and traveling on the same to the rear of, as well as in advance of, said pivotal connection whereby, when said traveling writing-mechanism is to the rear of said pivotal connection, the track-frame is tilted; a platen overlying the book-support and tiltable away from the same; a pivotal connection between the base and the platen; a lock connected to said base and disposed contiguous to the pivotal connection of the platen and operable to retain the platen in its tilted position independent of the position and operation of said track-frame, whereby access to, and positioning of a book on, the book-support is permitted and an oscillating member connecting with the locking-device and operative to actuate the same to operate the tiltable-member.

15. In a typewriting-machine, the combination of the following elements: a base; a book-support disposed below the plane of the base; a track-frame pivoted on said base; a pivotal connection between said base and the track-frame located intermediate of the ends of the track-frame; a writing-mechanism supported on said track-frame and traveling on the same to the rear of, as well as in advance of, said pivotal connection whereby, when said traveling writing-mechanism is to the rear of said pivotal connection, the track-frame is tilted; a platen overlying the book-support and tiltable away from the same; a pivotal connection between the base and the platen; a locking-device including an oscillating member connected to said base and disposed contiguous to the pivotal connection of the platen and operable to retain the platen in its tilted position independent of the position and operation of said track-frame, whereby access to, and positioning of a book on, the book-support is permitted; and means at the front end of the typewriting machine for locking the platen when depressed to its horizontal position.

16. In a typewriting machine, the combination of the following elements: a base or support, a hinged track-frame member and a hinged platen member mounted for tilting movement independently of each other; a locking means including a rotatable member and an engaging member, said means being connected to said support and engaging one of said hinged members to hold it in tilted position independently of the other of said hinged members.

17. In a typewriting machine, the combination of the following elements: a base or support; a hinged track frame and a hinged platen mounted for tilting movement independently of each other; locking means including an engaging member connected to said base and engaging one of said parts to hold the same in tilted position independently of the other, and means including a rotatable member for unlocking the same to permit return to normal position.

18. In a typewriting machine, the combination of the following elements: a base or support, a hinged track-frame and a hinged platen mounted for tilting movement independent of each other; and automatically operable locking means including a rotatable member and an engaging member, said locking means being connected to said base and engaging one of said hinged members to hold the same in tilted position independently of the other of said hinged members.

19. In a typewriting machine, the combination of the following elements: a base or support; a hinged track frame and a hinged platen mounted for tilting movement independently of each other; automatically operable locking means including an engaging member connected to said base and engaging one of said parts to hold the same in tilted position independently of the other, and means including a rotatable member for unlocking the same to permit return to normal position.

20. In a typewriting machine, the combination with a base, of writing mechanism longitudinally and laterally movable thereover for line and letter spacing, of a tilting member normally disposed beneath the writing mechanism, a pivotal connection between said member and the base, and means including a rock-member pivotally connected to the base to lock the tilting member in its tilted position.

21. In a typewriting machine, the combination with a base, of writing mechanism longitudinally and laterally movable thereover for line and letter spacing, of a tilting member normally disposed beneath the writing mechanism, a pivotal connection between said member and the base, and a toggle-element for locking the tilting member.

22. In a typewriting machine, the combination with a base, of writing mechanism longitudinally and laterally movable thereover for line and letter spacing, of a tilting member normally disposed beneath the writing mechanism, a pivotal connection between said member and the base, and means including a rock-member connecting with the base to lock the tilting member in its tilted position.

23. In a typewriting machine, the combination with a base, of writing mechanism longitudinally and laterally movable thereover for line and letter spacing, of a tilting member normally disposed beneath the writing mechanism, a pivotal connection between said member and the base, and means including a rock-member connecting with the base to lock the tilting member in its tilted position, and means for effecting unlocking of said locking means to permit return of said tilting member to normal position.

In testimony whereof, I affix my signature, in the presence of two subscribing witnesses.

GEORGE W. DONNING.

Witnesses:
H. T. AMBROSE,
W. L. BILLMYER.